Feb. 26, 1957
W. A. VOGT
2,783,031
GAS SCRUBBER
Filed Feb. 11, 1954
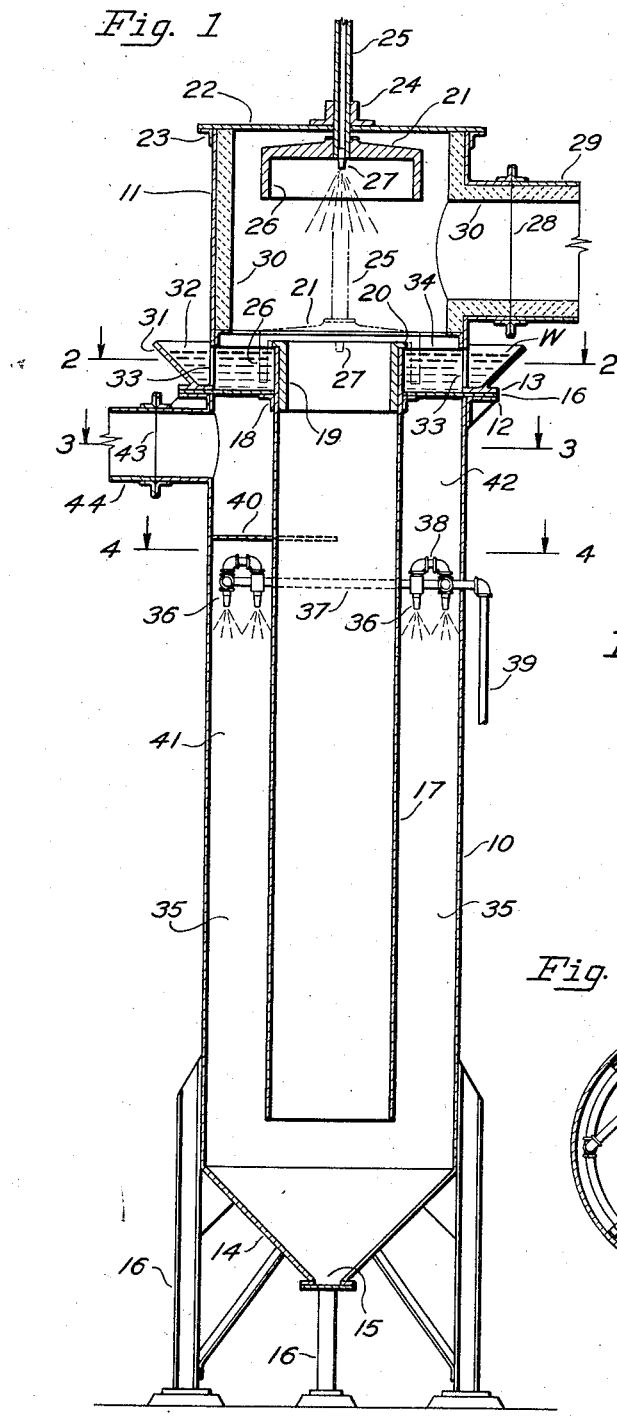
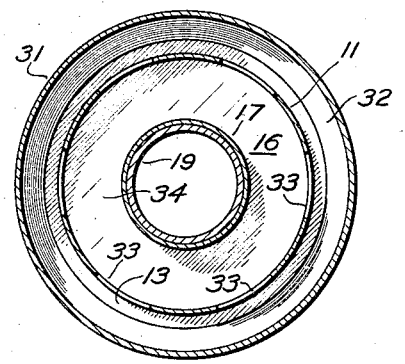
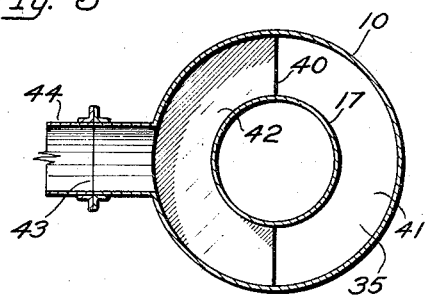
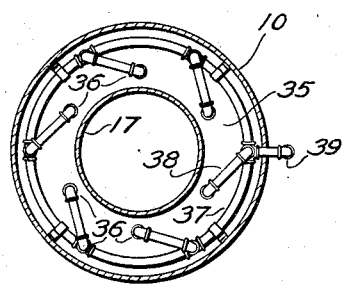
William A. Vogt
INVENTOR.
BY James E. Toomey
atty.

United States Patent Office 2,783,031
Patented Feb. 26, 1957

2,783,031

GAS SCRUBBER

William A. Vogt, Concord, Calif., assignor to Henry J. Kaiser Company, Oakland, Calif., a corporation of Nevada Application February 11, 1954, Serial No. 409,716

4 Claims. (Cl. 261—22)

This invention relates to systems for the cooling of hot gases, and the removal therefrom of dust and other suspended matter entrained therein, and more particularly, to the provision of a combined gas cooling and conditioning tower adapted to form a part of such a system.

Various devices are available for the collection of fine dust and fumes created as a result of industrial processes, these including centrifugal separators, electrical precipitators, scrubbers, ultrasonic agglomerating towers and screen-type cloth filters or bag filters. All of these devices have their own inherent characteristics of principle and design which restrict their individual application and scope within certain limits with regard to size and nature of partculate, fume characteristics and also temperature and moisture content of gases to be treated.

The cooling and conditioning tower, described herein, is especially adapted to the treatment of hot gases prior to their entry into a filter of the screen cloth or bag type, the use of this type of filter being restricted to low temperature separation and the handling of relatively dry gases. It will be apparent, however, that the aforementioned combination of tower and bag filter does not exhaust the utility of the invention, as its scope of usefulness is not restricted to this particular application.

It is the principal object of the present invention to provide a device adapted to the controlled cooling of hot gases.

A further object of the invention is the provision of a device adapted to regulate the relative humidity of gases being discharged therefrom.

A still further object of the invention is the provision of a device adapted to effect a preliminary separation of solid particles, from gases passing therethrough, by a process of elutriation.

These and other advantages will become apparent during the course of the following description and appended claims, taken in connection with the accompanying drawing forming a part hereof.

For the drawing:

Figure 1 is a vertical median section of a preferred embodiment of the device.

Figure 2 is a horizontal transverse section taken on line 2—2 of Figure 1.

Figure 3 is a horizontal transverse section taken on line 3—3 of Figure 1.

Figure 4 is a horizontal transverse section taken on line 4—4 of Figure 1.

Referring to the drawing in detail:

An outer shell 10 of generally cylindrical form has superimposed thereon a second or gas-receiving section 11 of relatively shorter length, but being of substantially the same diameter, and being secured in concentric alignment by means of flanges 12 and 13 on the shell 10 and upper section 11 respectively.

The lower end of the cylindrical shell 10 is in the form of a hopper 14, having a discharge opening 15 provided for the periodic removal of extraneous matter precipitated during operation of the unit. Legs 16, suitably braced as indicated, have been provided for mounting the shell 10 and maintaining it in position.

An annular shaped dividing plate or diaphragm 16, secured in place between flanges 12 and 13, effects a partial separation between the spaces within the shell 10 and the upper section 11. Of course the outer shell and the upper section could be made integral with the dividing plate mounted inside. Extending downwardly through the diaphragm 16 and being securely attached thereto, is an open ended, inner tubular member or hot gas duct 17. A relatively short portion of the tubular member 17 extends above the diaphragm 16; however, within the shell 10, it extends to a point closely adjacent the hopper 14. An angle 18 or other suitable means is provided to maintain the tubular member 17 in correct relationship with other parts of the device.

At the upper end thereof, the tubular member 17 is provided with an inner protective lining 19 having an outwardly extending flange 20 resting upon and completely covering the top edge of said tubular member. The lining 19 is adapted to protect the tubular member 17 from direct contact with the gases within the hot gas receiving zone, and the upper face of the flange 20 serves as a valve seat cooperating with a valve 21 to effect a closure of the upper end of the tubular member.

A cover 22 seals the upper end of the section 11, being removably attached thereto by means of a flange 23 as indicated. Slidably mounted within a bushing 24 centrally located, and secured to the cover 22, is a vertical, hollow valve stem 25 which, at its lower end, has the valve 21 attached thereto. The valve 21 is in the form of a disc, which, as is indicated in phantom in the closed position on Figure 1, is adapted to rest upon the flange 20 of the protective liner 19. A depending skirt 26, forming part of the valve 21, loosely encircles the upper end of the tubular member 17 when the valve is in the closed position, and, when in that position, the lower edge of the skirt 26 is in close proximity with the diaphragm 16.

Inserted in the lower end of the hollow valve stem 25, and being contained within the confines of the skirt 26, is a spray nozzle 27 adapted to protect the valve 21 from the effects of the high temperatures to which it is subjected. The upper end of the valve stem 25 will communicate with a source of cooling water, and also will have attached thereto suitable mechanism for the operation of the valve, neither of which has been indicated on the drawing.

A flanged opening 28 is provided in the side of the upper section 11 for the reception of hot gases and is adapted to communicate with a supply duct 29 as indicated on Figure 1. The inner vertical walls of the section 11, and the tubular opening 28 therein, are preferably lined with a refractory material 30 for protection against the relatively high temperature of the gases passing therethrough.

Extending upwardly from the flange 13, and encircling the lower end of the section 11 in concentric relationship therewith, is a relatively low diverging wall 31 adapted to cooperate with the lower end of said section to form an open channel 32. The upper edge of the wall 31 is at an elevation coincident with that of the flange 20 of the protective liner 19. A plurality of openings 33 connect the outer channel 32 with an inner channel 34 bounded by the lower end of the inside wall of the section 11, and the upper end of the outer surface of the tubular member 17, the bottom of the channel being formed by the diaphragm 16. Water as indicated by W on Figure 1, is introduced into the outer channel 32 and, flowing through the openings or ports 33, establishes a common level with channel 32 in the inner channel 34. This water level is such that the skirt 26 of the valve 21 will be substantially submerged when the valve is in a closed position, all as clearly delineated on Figure 1 of the drawing. It will be apparent that, with the above arrangement, the egress of gas from the interior of the section 11 can be effectively precluded.

The water W in the outer channel 32, having its surface exposed to the atmosphere, will be maintained at a relatively cool temperature, and of course, the provision of the outer, open channel will greatly facilitate the replenishing of the water when such action becomes necessary.

Contained within the annular space 35 surrounding the tubular member 17 and being bounded outwardly by the cylindrical shell 10, is a bank of spray or fog nozzles 36 so arranged as to effectively cover the entire horizontal expanse of the aforesaid space. A plurality of banks of nozzles can of course be utilized when conditions dictate the advisability of such an arrangement, the disclosure of Figure 1 being purely illustrative. It will also be apparent that the header or manifold 37 can be mounted on the outside of the shell 10, the individual feed pipes 38 extending through the wall of the shell into the annular space 35. A main feed pipe 39 communicates with a controlled source of cold water not indicated.

Located a short distance above the bank of nozzles 36, is a baffle or gas diverting member 40 adapted to divide the space 35 into a relatively large, lower cooling and precipitating zone 41, and a relatively small, upper reheating zone 42. As can be seen on Figure 3, the edge of the baffle 40 is so located as to divide the annular space 35 diametrically, thus making it necessary for all gases, in their movement through the tower, to pass to one side of the inner tubular member 17 at the point where they leave the cooling and precipitating zone 41 and enter the reheating zone 42.

By this arrangement, the gases from the cooling zone 41 are brought into contact with the hot gas duct 17 as they pass through the reheating zone 42.

A flanged discharge opening 43 provides an egress for the conditioned gases from the reheating zone 42, the opening being located symmetrically relative to the baffle 40 and being located on the same side of the tower.

A duct 44, fragmentarily indicated, carries the discharged gases to the next unit in the cleaning system.

In operation, with the valve in the open position and all spray nozzles turned on, the hot, dirty gases are admitted into the upper section of the tower and receive a preliminary cooling effect from the nozzle located within the valve. Passing downwardly and out through the lower end of the tubular member 17, the flow is reversed and the gases continue upwardly through the cooling and conditioning zone 41, being meanwhile subjected to the scrubbing and cooling action of the spray from the bank or banks of nozzles. The coarser dust particles carried by the gas stream will be removed by the above-mentioned scrubbing action, and the temperature can be lowered sufficiently for further conditioning in the reheating zone.

The materials used in the manufacture of screen type filters are not suitable for high temperature separation, and, due to the foraminous nature of these materials, neither are they able to effectively filter gases containing moisture or anything of such a nature as to cause it to adhere to the material, fill up the pores and eventually constitute an obstruction necessitating removal of the filter elements.

The gases entering the reheating zone have been cleansed of all the coarser particles, and the temperature has been lowered substantially below the upper limit established for screen type filters. The moisture content of the gases, however, is still too high for continued trouble-free filtering. In order to correct this condition the gases are forced to that side of the tower opposite to the discharge opening by the baffle forming the lower extent of the reheating zone, and must pass around the hot walls of the inner tubular member before being discharged through said opening. The heat given off by the walls of the tubular member, where it passes through the reheating zone, will cause a partial evaporation of the moisture content of the gases, and also, raising the temperature of the gases beyond their dew point, but still within the aforementioned upper temperature limit, will thus reduce them to a condition where they may be readily filtered without other than normal effects to the filtering medium.

From the foregoing it will be apparent that I have provided a means of conditioning hot gases and preparing them for further treatment by screen type filters, and while I have disclosed a preferred embodiment of my device, it should be understood that further modifications may be made within the spirit and scope of the appended claims.

I claim:

1. An apparatus for conditioning hot gases comprising a substantially closed zone including an outer shell member and a gas receiving means, a tubular member disposed within and extending throughout a major portion of the length of said shell member and providing a gas passage therebetween, said tubular member providing communication between said shell member and said gas receiving means, said shell member having a gas outlet located above the lower extremity of said tubular member, a semi-annular baffle disposed horizontally in the upper portion of said gas passage adjacent and below said outlet, said baffle extending between and contiguous with the inner surface of said shell member and the outer surface of said tubular member and dividing the said gas passage diametrically thereby forcing the gases to flow around the portion of said tubular member above the baffle and remote from said outlet, and liquid spray means disposed between said tubular member and said shell member and below said baffle.

2. An apparatus for conditioning hot gases comprising an upstanding shell member, a gas receiving section superimposed on said shell member and having an inlet for receiving hot dust laden gases, a divider plate disposed between said shell and said gas receiving section and having an opening therein, a hot gas duct providing communication between said gas receiving section and said shell member through said opening and extending into said shell member for a major portion of its length, providing a gas passage therebetween, a valve assembly disposed within said gas receiving section and comprising a disc and a cylindrical flange depending from said disc, said valve when closed being adapted to seal said hot gas duct thereby preventing re-entry of gases to the gas receiving section when gas feed thereto is discontinued, a spray means disposed within said valve assembly at the central portion of said disc to initially cool said hot gases when the valve is in normal open position, said shell member having a gas outlet located therein in close proximity to said divider plate, gas-diverter means disposed within said shell member, said gas-diverter means being disposed within said gas passage adjacent and below said gas outlet and adapted to force the gases to flow around the portion of said hot gas duct remote from said outlet and above the gas-diverter means, and coolant spray means disposed in the gas passage between said hot gas duct and said shell member and below said gas-diverter means.

3. An apparatus for conditioning hot gases comprising an upstanding shell member, a gas receiving section superimposed on said shell member and having an inlet for receiving hot dust laden gases, a divider plate disposed between said shell and said gas receiving section and having an opening therein, a hot gas duct providing communication between said gas receiving section and said shell member through said opening and extending into said shell member for a major portion of its length providing a gas passage therebetween, a valve assembly disposed within said gas receiving section and comprising a disc and a cylindrical flange depending from said disc, said valve when closed being adapted to seal said hot gas duct thereby preventing re-entry of gases to the gas receiving section when gas feed thereto is discontinued, a spray means disposed within said valve assembly at the central portion of said disc to initially cool said hot gases when the valve is in normal open position, said shell member having a gas outlet located therein in close proximity to said divider plate, a semi-annular baffle disposed horizontally in the upper portion of said gas passage adjacent and below said outlet, said baffle extending between and contiguous with the inner surface of said shell member and the outer surface of said hot gas duct and dividing the said gas passage diametrically thereby forcing the gases to flow around the portion of said hot gas duct above the baffle and remote from said outlet, and coolant spray means disposed in the gas passage between said hot gas duct and said shell member and below said baffle.

4. An apparatus for conditioning hot gases comprising a substantially closed zone including an outer shell member and a gas receiving means, a tubular member disposed within and extending throughout a major portion of the length of said shell member and providing an annular gas passage therebetween, said tubular member providing communication between said shell member and said gas receiving means, said shell member having a gas outlet located above the lower extremity of said tubular member, a segmented annular baffle disposed in the upper portion of said gas passage adjacent and below said outlet, said baffle completely spanning said gas passage throughout a substantial portion of the annular area thereof adjacent said outlet thereby forcing the gases to flow around the portion of said tubular member above the baffle and remote from said outlet, and liquid supply means disposed below the level of said baffle for introducing a cooling liquid into contact with the hot gases.

References Cited in the file of this patent

UNITED STATES PATENTS

| | | |
|---|---|---|
| 204,577 | Jones | June 4, 1878 |
| 889,694 | Lambert | June 2, 1908 |
| 1,980,522 | Hawley | Nov. 13, 1934 |
| 2,520,825 | Baumann | Aug. 29, 1950 |
| 2,667,941 | Ekstrom | Feb. 2, 1954 |

FOREIGN PATENTS

| | | |
|---|---|---|
| 514,413 | Germany | Dec. 11, 1930 |
| 541,724 | Germany | May 14, 1932 |